June 7, 1938. B. O. CONE 2,120,018
CLAMPING DEVICE
Filed Nov. 9, 1936

Inventor
B. O. Cone,
By Church & Church
His Attorneys

Patented June 7, 1938

2,120,018

UNITED STATES PATENT OFFICE 2,120,018

CLAMPING DEVICE

Burtis O. Cone, Richmond, Va., assignor to Crawford Manufacturing Company, Inc., Richmond, Va., a corporation of Virginia Application November 9, 1936, Serial No. 110,020

3 Claims. (Cl. 248—273)

This invention relates to improvements in clamping devices and particularly to means for supporting rods, such as the head rods of awnings, shades or curtains.

One object of the invention is to provide a clamping device of this type which can be produced at an exceedingly low cost, due primarily to the fact that liberal tolerances can be allowed in the proportioning of the individual elements of the clamp and in the relative sizes of said elements.

A further object of the invention is to provide a clamp wherein the pressure developed for securing the rod against the clamping plate of the device will also force said plate into more intimate contact with the structure on which the device is used, thus more firmly securing the plate in place against said structure.

With these and other objects in view, the invention consists in certain details of construction and combinations and arrangements of parts, all as will hereinafter be more fully described and the features of novelty particularly pointed out in the appended claims.

In the accompanying drawing—

Figure 1:
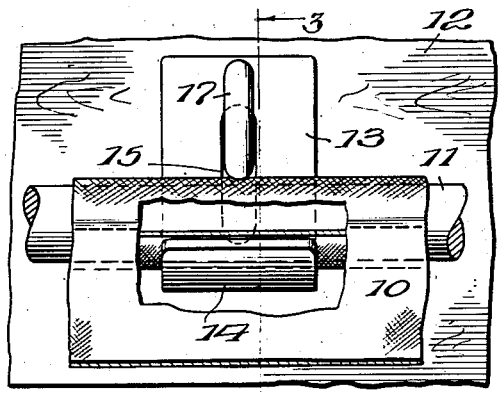
Figure 1 is a front elevational view illustrating a rod firmly clamped in place.
Figure 3:
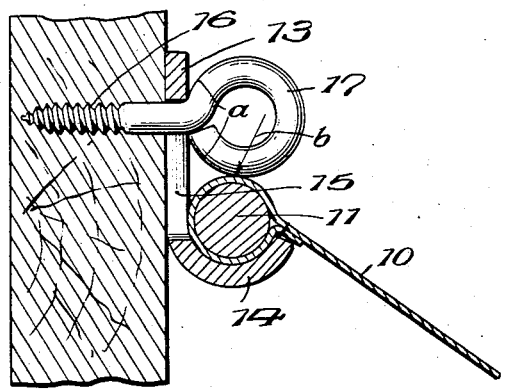
Fig. 3 is a vertical sectional view on the line 3—3 of Fig. 1.
Figure 2:
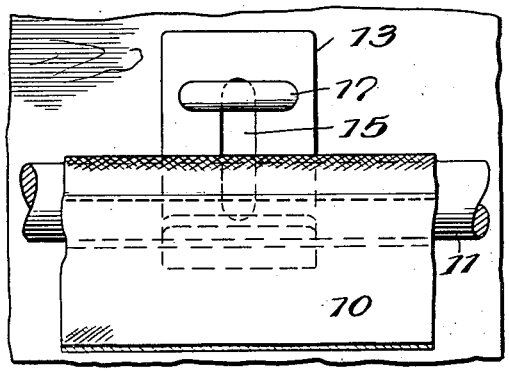
Fig. 2 is a similar view showing the rod released.

Referring to Figs. 1 to 3, the awning 10, or the like, having the usual head rod 11 is adapted to be suspended or supported from the wall or other structure 12. The head rod is directly supported on a clamping plate 13 whose lower end portion is offset to form a recess in which the rod is seated and clamped. In the present instance, the plate terminates in a hook-like portion 14. In the upper portion of the plate there is an aperture 15 adapted to receive the shank of a fastening element 16 which extends through said aperture into the supporting structure 12. The functioning of the several elements of the present device is such that the aperture 15 may be considerably larger than the cross-section of the shank of the other fastening element. For instance, the aperture may be in the form of an elongated slot. Preferably, a screw having a head in the form of an eye 17 is used for securing the device in place. It is, however, only essential that the screw have two cam surfaces diverging from opposite sides of the shank. In the present instance, the side portions of the eye 17, which portions are indicated at a, constitute the cam surfaces referred to. As the screw is forced into the structure 12, one of these cam surfaces ultimately engages against the end wall of the slot 15 and the other against the rod 11, and the two surfaces function as a wedge to securely clamp the plate 13 against the supporting structure. In other words, the eye or head is wedged between the rod and the wall of the aperture and, as indicated by the arrow b in Fig. 3, the inclination of the so-called cam surfaces formed by the head of the screw is such that the rod will be urged downwardly and inwardly, so to speak, and, as a consequence, will force the lower portion of the clamping plate 13 more firmly against structure 12. As there is only one cam surface at each side of the screw, the entire wedging force or pressure of the single cam surface on the rod is utilized in securing the plate 13 in position. There are no additional cam surfaces setting up a force tending to urge the rod away from plate 13.

Figure 4:
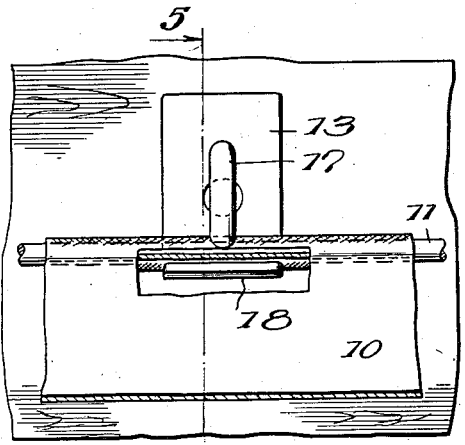
Fig. 4 is a front view of a modified form of clamp for rods of smaller cross section.
Figure 5:
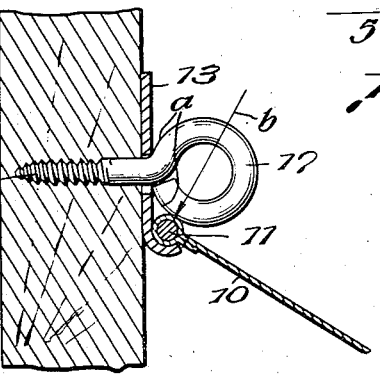
Fig. 5 is a vertical section on the line 5—5 of Fig. 4.

In the form of the invention illustrated in Figs. 4 and 5, the aperture in plate 13 is circular. The lower end of said plate is merely offset as at 18 and the rod is simply clamped in the angle of the offset and plate proper. In view of the fact that the action of the cam surface of the screw head forces the rod inward, the offset may be comparatively short and need not necessarily be extended into the hook-like formation shown in Figs. 1 to 3. The same wedging action of the camming surfaces of the screw on the wall of the aperture and on the rod to firmly clamp the plate against the supporting structure 12 is also present in this modified form of the invention.

It will be readily seen that no great degree of accuracy is required in forming the cam surfaces on the screw or in the spacing of the aperture and offset or hook of plate 13. Likewise, the relative sizes of the screw and aperture are more or less immaterial. Consequently, the ordinary eye screw now on the open market and which can be obtained at an exceedingly low cost is well adapted for use in the present device. In addition, the plate 13 is certain to be firmly secured against the wall or other structure as the force utilized for clamping the rod in position aids in securing the plate. It will, of course, be understood that the rod can be readily released and removed by simply backing off or retracting the screw or other fastening element.

What I claim is:

1. In a device of the character described, an apertured plate adapted to be secured against a backing structure, an offset projecting from said plate, said offset and plate forming a recess, a rod seated in said recess, and a screw in the aperture in the plate, said screw having a cam surface bearing directly against the rod in said recess, said cam surface being disposed at an angle relatively to the plate to force the rod toward the plate and backing structure and assist in clamping the plate against said structure, said rod being retained in the recess in the plate solely by said screw.

2. In a device of the character described, a plate adapted to be secured against a backing structure, said plate having an aperture therein, a shoulder on said plate forming a recess, a rod seated in said recess, and a fastening element extending through said aperture into said structure, said fastening element having a camming surface bearing directly against the rod in said recess, said camming surface being disposed at an angle relatively to said plate to force said rod and plate toward said structure and to force the fastening element against the wall of said aperture whereby the plate is clamped against the supporting structure, said rod being retained in the recess in the plate solely by said fastening element.

3. In a device of the character described, a plate adapted to be clamped against a supporting structure, said plate having an elongated aperture therein, a shoulder on said plate forming a recess, a rod seated in said recess, said rod being disposed transversely of said aperture and only partially embraced by said recessed shoulder and a fastening element having a shank extending loosely through said aperture, said fastening element also having a cam surface bearing directly against the rod in said recess, the angular disposition of said cam surface with respect to said plate being such as to force the shank of the element toward one end of said aperture and to force the rod and plate toward said supporting structure, said rod being retained in said recess solely by said fastening element and being free to be lifted from the recess upon disengagement of said fastening element.

BURTIS O. CONE.